United States Patent
Beveridge

(10) Patent No.: US 11,010,197 B2
(45) Date of Patent: *May 18, 2021

(54) DYNAMIC ALLOCATION OF PHYSICAL COMPUTING RESOURCES AMONGST VIRTUAL MACHINES

(71) Applicant: Daniel James Beveridge, Apollo Beach, FL (US)

(72) Inventor: Daniel James Beveridge, Apollo Beach, FL (US)

(73) Assignee: VMware, Inc., Palo Alto, CA (US)

( * ) Notice: Subject to any disclaimer, the term of this patent is extended or adjusted under 35 U.S.C. 154(b) by 70 days.

This patent is subject to a terminal disclaimer.

(21) Appl. No.: 14/679,007

(22) Filed: Apr. 5, 2015

(65) Prior Publication Data

US 2015/0212857 A1 Jul. 30, 2015

Related U.S. Application Data

(63) Continuation of application No. 13/558,211, filed on Jul. 25, 2012, now Pat. No. 9,003,037.

(51) Int. Cl.
*G06F 9/455* (2018.01)
*G06F 9/50* (2006.01)
*G06F 9/54* (2006.01)

(52) U.S. Cl.
CPC ........ *G06F 9/5011* (2013.01); *G06F 9/45533* (2013.01); *G06F 9/542* (2013.01)

(58) Field of Classification Search
CPC ..... G06F 9/5011; G06F 9/45533; G06F 9/542
See application file for complete search history.

(56) References Cited

U.S. PATENT DOCUMENTS

| 6,760,903 B1 * | 7/2004 | Morshed ............. G06F 11/3466 717/130 |
| 7,577,959 B2 | 8/2009 | Nguyen et al. |

(Continued)

OTHER PUBLICATIONS

Ongaro, Diego, "Scheduling I/O in Virtual Machine Monitors", Mar. 5-7, 2008, 10 pages.

(Continued)

*Primary Examiner* — Emerson C Puente
*Assistant Examiner* — Jonathan R Labud

(57) ABSTRACT

Techniques for resource allocation are described. Some embodiments provide a resource allocation manager configured to dynamically allocate physical computing resources amongst multiple virtual machines hosted on a physical computing system. The resource allocation manager receives information about the importance of activities that can occur on the multiple virtual machines. Activities may include or be based on virtual machine states, virtual desktop states, business activities or processes performed by users, or the like. Then, the resource allocation manager determines that an activity is occurring on one of the virtual machines. In response, the resource allocation manager reallocates physical computing resources of the physical computing system that are assigned or available to the one virtual machine, based on the occurring activity and its corresponding importance. The resource allocation manager continually and dynamically reallocates physical computing resources assigned to corresponding virtual machines, in order to match resource allocation to activity importance.

20 Claims, 8 Drawing Sheets

| | Activity Type | Activity ID | Priority |
|---|---|---|---|
| 201a | New Customer Record Generation | A | 1 |
| 201b | Record Transfer | B | 2 |
| 201c | Account Open | C | 1 |
| 201d | Account Close | D | 2 |
| 201e | Work Email | E | 2 |
| 201f | Personal Email | F | 3 |
| 201g | External Access | G | 3 |
| 201h | No User Session | M | 3 |
| 201i | User Session Active | N | 1 |
| 201j | User Session Idle | O | 2 |
| 201k | User Session Idle > 5 Minutes | P | 3 |
| 201l | External Network Access | Q | 2 |
| 201m | ... | | |

(56) References Cited

U.S. PATENT DOCUMENTS

| | | | |
|---|---|---|---|
| 8,191,086 B2* | 5/2012 | Sandland | G06F 9/45537 |
| | | | 719/328 |
| 8,260,840 B1 | 9/2012 | Sirota et al. | |
| 8,271,644 B2 | 9/2012 | Radhakrishnan et al. | |
| 8,321,558 B1 | 11/2012 | Sirota et al. | |
| 8,429,276 B1* | 4/2013 | Kumar | G06F 9/5077 |
| | | | 709/226 |
| 13,429,276 | 4/2013 | Kumar | |
| 8,560,671 B1 | 10/2013 | Yahalom et al. | |
| 8,738,972 B1 | 5/2014 | Bakman | |
| 8,789,041 B2 | 7/2014 | Verma | |
| 9,003,037 B2 | 4/2015 | Beveridge | |
| 2002/0059274 A1* | 5/2002 | Hartsell | H04L 41/0803 |
| 2002/0083110 A1* | 6/2002 | Kozuch | G06F 1/3203 |
| | | | 718/1 |
| 2005/0262504 A1 | 11/2005 | Esfahany et al. | |
| 2006/0184935 A1 | 8/2006 | Abels | |
| 2006/0200821 A1* | 9/2006 | Cherkasova | G06F 11/3423 |
| | | | 718/1 |
| 2007/0171921 A1* | 7/2007 | Wookey | G06F 3/1415 |
| | | | 370/401 |
| 2007/0300221 A1 | 12/2007 | Hartz | |
| 2008/0192763 A1* | 8/2008 | Davis | H04L 12/2801 |
| | | | 370/412 |
| 2008/0229031 A1* | 9/2008 | Villarreal | G06F 9/5088 |
| | | | 711/153 |
| 2009/0007106 A1 | 1/2009 | Araujo, Jr. | |
| 2010/0044519 A1 | 2/2010 | Fol et al. | |
| 2010/0211958 A1 | 8/2010 | Madison, Jr. | |
| 2010/0223368 A1 | 9/2010 | Runcie | |
| 2010/0306163 A1* | 12/2010 | Beaty | G06F 9/5077 |
| | | | 706/52 |
| 2010/0325261 A1 | 12/2010 | Radhakrishnan et al. | |
| 2010/0325278 A1 | 12/2010 | Heim | |
| 2011/0022812 A1* | 1/2011 | van der Linden | H04L 67/1097 |
| | | | 711/163 |
| 2011/0125895 A1 | 5/2011 | Anderson et al. | |
| 2011/0126197 A1 | 5/2011 | Larsen et al. | |
| 2011/0145506 A1* | 6/2011 | Cherukuri | G06F 12/084 |
| | | | 711/130 |
| 2011/0153838 A1* | 6/2011 | Belkine | G06F 9/505 |
| | | | 709/227 |
| 2011/0154320 A1 | 6/2011 | Verma | |
| 2011/0209156 A1* | 8/2011 | Box | G06F 9/5077 |
| | | | 718/104 |
| 2011/0251992 A1 | 10/2011 | Bethlehem | |
| 2012/0036251 A1* | 2/2012 | Beaty | G06F 9/45558 |
| | | | 709/224 |
| 2012/0044519 A1 | 2/2012 | Wu | |
| 2012/0054409 A1 | 3/2012 | Block et al. | |
| 2012/0089666 A1 | 4/2012 | Goswami | |
| 2012/0166624 A1 | 6/2012 | Suit | |
| 2012/0222004 A1 | 8/2012 | Labat | |
| 2012/0246646 A1* | 9/2012 | Bakman | G06Q 30/02 |
| | | | 718/1 |
| 2013/0014101 A1 | 1/2013 | Ballani | |
| 2013/0080619 A1 | 3/2013 | Assuncao et al. | |
| 2013/0086235 A1 | 4/2013 | Ferris | |
| 2013/0311662 A1 | 11/2013 | Stolyar | |
| 2013/0346618 A1 | 12/2013 | Holkkola | |
| 2014/0052864 A1 | 2/2014 | Van Der Linden et al. | |
| 2014/0059229 A1 | 2/2014 | Parikh | |
| 2014/0173591 A1 | 6/2014 | Lin et al. | |
| 2014/0250436 A1 | 9/2014 | Tang et al. | |
| 2014/0282529 A1 | 9/2014 | Bugenhagen | |
| 2014/0372553 A1 | 12/2014 | Blackburn | |
| 2015/0212857 A1 | 7/2015 | Beveridge | |
| 2016/0041839 A1 | 2/2016 | Wright | |

OTHER PUBLICATIONS

Quyet Thang, Virtual Machine Allocation in cloud Computing for Minimizing Total Execution Tine on Each Machine, 2013.

* cited by examiner

| | Activity Type | Activity ID | Priority |
|---|---|---|---|
| 201a | New Customer Record Generation | A | 1 |
| 201b | Record Transfer | B | 2 |
| 201c | Account Open | C | 1 |
| 201d | Account Close | D | 2 |
| 201e | Work Email | E | 2 |
| 201f | Personal Email | F | 3 |
| 201g | External Access | G | 3 |
| 201h | No User Session | M | 3 |
| 201i | User Session Active | N | 1 |
| 201j | User Session Idle | O | 2 |
| 201k | User Session Idle > 5 Minutes | P | 3 |
| 201l | External Network Access | Q | 2 |
| 201m | ... | | |

*Fig. 2A*

| Activity Type | Activity ID | Time | Priority |
|---|---|---|---|
| New Customer Record Generation | A | 10s | 1 |
| Record Transfer | B | 30s | 2 |
| Account Open | C | 15s | 1 |
| Account Close | D | 10s | 2 |
| Work Email | E | 30s | 2 |
| Personal Email | F | 45s | 3 |
| External Access | G | 30s | 3 |
| ... | | | |

*Fig. 2C*

| | Activity Type | Activity ID | CPU | Mem. | IO | Net. |
|---|---|---|---|---|---|---|
| 261a | New Customer Record Generation | A | 1 | 1 | 2 | 1 |
| 261b | Record Transfer | B | 2 | 1 | 1 | 1 |
| 261c | Account Open | C | 1 | 2 | 2 | 1 |
| 261d | Account Close | D | 2 | 1 | 2 | 2 |
| 261e | Work Email | E | 2 | 2 | 2 | 1 |
| 261f | Personal Email | F | 2 | 3 | 3 | 2 |
| 261g | External Access | G | 3 | 2 | 3 | 3 |
| 261h | ... | | | | | |

*Fig. 2E*

DYNAMIC ALLOCATION OF PHYSICAL COMPUTING RESOURCES AMONGST VIRTUAL MACHINES

CLAIM OF PRIORITY

This application is a continuation of U.S. patent application Ser. No. 13/558,211, filed on Jul. 25, 2012, by Daniel Beveridge, entitled "DYNAMIC ALLOCATION OF PHYSICAL COMPUTING RESOURCES AMONGST VIRTUAL MACHINES," which corresponds to U.S. Pat. No. 9,003,037 issuing on Apr. 7, 2015, and the entirety of which is incorporated by reference herein.

TECHNICAL FIELD

The present disclosure relates to methods, techniques, and systems for dynamic allocation of physical computing resources amongst virtual machines and, more particularly, to methods, techniques, and systems for allocating physical computing resources amongst multiple virtual machines executing on one or more physical computing systems, based on the importance of activities occurring on one or more of the virtual machines.

BACKGROUND

Existing approaches to resource allocation in a virtualized computing environment are typically based on relatively static and/or coarse-grained decisions about the expected workload to be processed within the virtualized computing environment. A virtualized computing environment typically includes multiple physical computing systems that each include a hypervisor, virtual machine monitor, or similar logic that is configured to manage the concurrent execution of multiple virtual machines. Each virtual machine may have a distinct guest operating system and corresponding applications.

When a virtual machine is created, it may be assigned or given access to some portion of the physical resources of its host physical computing system. Typically, the amount of physical resources (e.g., CPU or memory) is determined when the virtual machine is defined or instantiated, and not changed or modified during the active lifetime of the virtual machine. Such an approach may be lead to some resources being unavailable to time-sensitive user activities, hindering the performance of virtual machines that need resources for more important activities.

In addition, decisions regarding the amount of physical resources to assign or provide to a virtual machine are often made on an ad hoc basis or otherwise based on inaccurate or outdated information. For example, many organizations simply utilize a "one size fits all" approach to resource allocation, and provide a uniform resource set for virtual machines allocated for different users or uses. Such uniform allocation, while simple and seemingly fair, does not consider the actual computing needs of those users, which may vary dramatically based on differing roles, projects, or even time of day. Such uniform allocation decisions may result in a collection of virtual machines that may not be closely matched to their actual computing requirements, in that some virtual machines do not have sufficient resources, while others are allocated excess resources based on the low priority tasks they are executing.

Typically, the above issues are addressed by providing every virtual machine with substantial excess computing capacity, in order to minimize user frustration due to under-resourced virtual machines. Of course, while this approach may reduce user frustration for high-need users, it allows virtual machines executing low priority activities to consume critical resources during periods of high demand, causing performance degradation for other important users or processes.

BRIEF DESCRIPTION OF THE DRAWINGS

FIGS. 2A-2E illustrate example resource allocation scenarios according to example embodiments.

DETAILED DESCRIPTION

Figure 1:
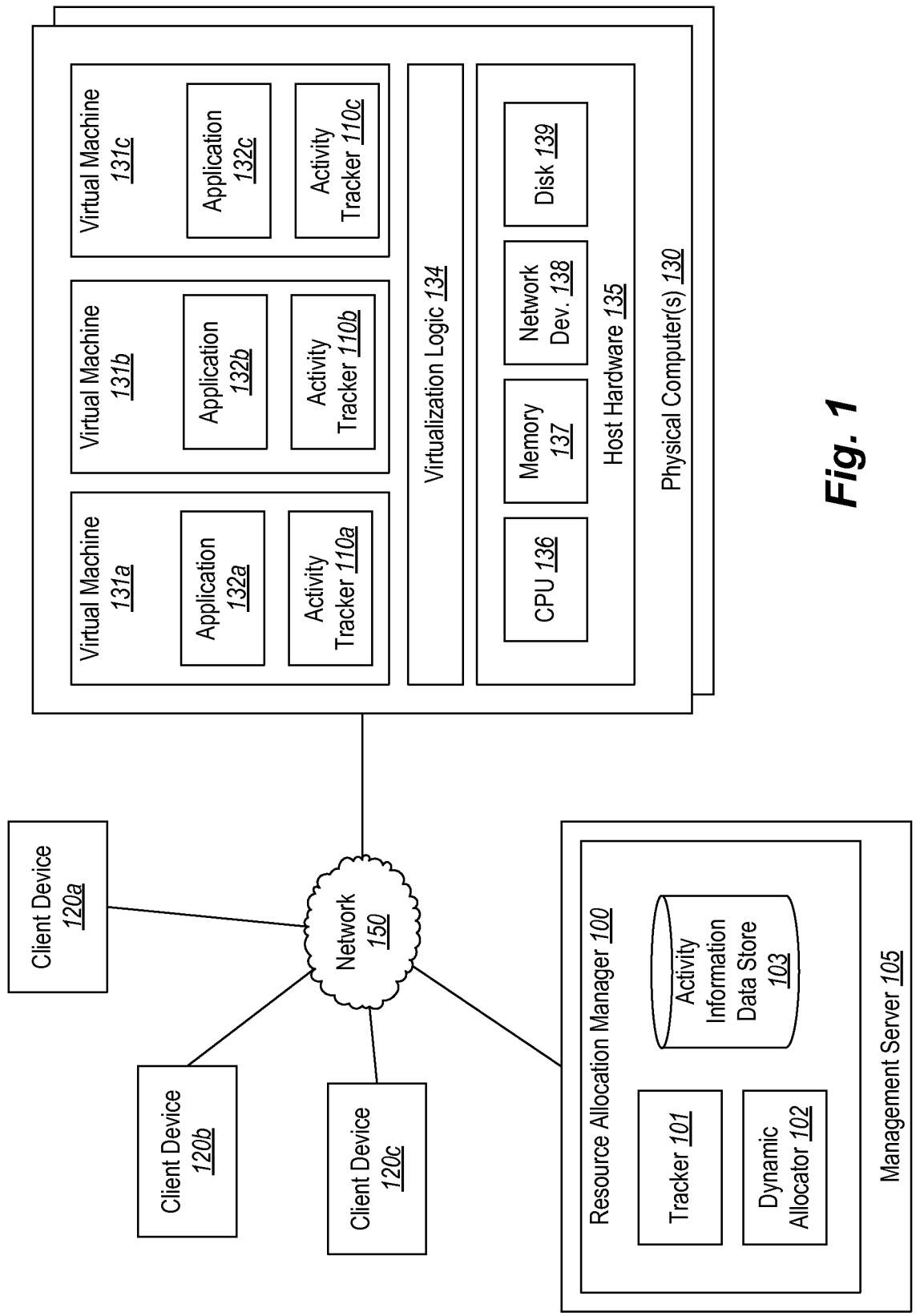
FIG. 1 is an example block diagram illustrating a resource allocation manager according to an example embodiment.

Embodiments described herein provide enhanced computer- and network-based methods, techniques, and systems for allocating physical computing resources amongst multiple virtual machines executing on a physical computing system, based on the importance of activities occurring on one or more of the virtual machines. Allocating physical computing resources may include allocating access to or shares of hardware devices or elements of a physical computing system, including processing resources (e.g., CPU resources), memory resources (e.g., RAM), input/output resources (e.g., disk bandwidth), network resources (e.g., network bandwidth), or the like. The physical computing resources may be allocated dynamically in response to a changing mix of activities occurring on the virtual machines hosted by the physical computing system. The amount or level of resources that are made available to a particular virtual machine may be based on the importance of the particular activities that are occurring on that virtual machine, such that virtual machines where more important activities are occurring will be provided with a greater share of the physical resources.

Example embodiments provide a resource allocation manager that performs at least some of the described techniques. In one embodiment, the resource allocation manager dynamically allocates physical computing resources amongst multiple virtual machines hosted by multiple physical computing systems. Initially, the resource allocation manager receives indications of importance of various activities that can occur on the multiple virtual machines. An activity may be or include a business activity that is performed by a user with respect to one or more applications executing on a virtual machine. In a sales or customer relationship management context, example business activities may include opening/closing a customer account, responding to a customer query or complaint, making a sale, checking work email, checking personal email, or the like.

An activity may also or instead include state information related to a user session or connection to a virtual machine via a virtual desktop or similar user interface. In some embodiments, multiple users access or otherwise connect to virtual remote desktops provided by distinct virtual machines. In this context, an activity may be or include a particular state of a user's connection to a virtual machine, such as whether or not a user is logged into a virtual machine, whether a logged in user is active or inactive, whether a user has been inactive for a particular time interval, an indication of a particular application being executed or accessed by the user, or the like.

Activities such as those discussed above may be associated with a level or other indicator of importance or value of the activity to a person, organization, or other entity. For example, making a sale may be considered more important than responding to a customer query, which in turn may be considered more important than checking personal email. As another example, an active logged in user may be considered more important than an inactive logged in user, which in turn may be considered more important than a virtual machine that does not have any logged in users.

The resource allocation manager may then monitor the activities occurring on each of multiple virtual machines hosted by a physical computing system, and then dynamically adjust or reallocate physical computing resources of the physical computing system based on the importance of the occurring activities. For example, a first virtual machine where a personal email activity (low importance) is occurring may be allocated a lower share of the physical resources than a second virtual machine where a new customer account activity (medium importance) is occurring. The resource allocation is readjusted as different activities are initiated or terminated. Continuing the above example, when a customer sale activity (highest importance) begins on the first virtual machine, the resource allocation manager may increase the share of the physical resources allocated to that virtual machine, even beyond those of the second virtual machine, where a medium importance activity (e.g., new customer account creation) is still occurring.

System Overview and Examples of Operation

FIG. 1 is an example block diagram illustrating a resource allocation manager according to an example embodiment. In particular, FIG. 1 depicts a resource allocation manager 100 that is executing on a management server 105. The resource allocation manager 100 allocates physical computing resources of one or more physical computers 130 based on activities occurring thereon. Each physical computer 130 includes host hardware 135, virtualization logic 134, and multiple virtual machines 131a-131c. Although only three virtual machines 131a-131c are shown, it should be recognized that any number of virtual machines may reside on each of any number of physical computers 130. The resource allocation manager 100 allocates physical resources of the physical computer 130 amongst the virtual machines 131a-131c. The physical resources allocated include elements of the hardware 135, including a CPU 136, a memory 137, a network device 138, and a disk 139. In the illustrated example, each of the virtual machines 131a-131c is executing a respective application 132a-132c and a respective activity tracker 110a-110c. Each of the applications 132a-132c may be accessed by one of the client devices 120a-120c operated by a corresponding user (not shown). The management server 105, the client devices 120a-120c, and the physical computers 130 are all communicatively coupled to one another via a network 150.

The resource allocation manager 100 includes a tracker 101, a dynamic allocator 102, and an activity information data store 103. The tracker 101 receives and records information about activities that can occur or that are occurring on the virtual machines 131a-131c. The tracker 101 receives activity information from each of the activity trackers 110a-110c and stores it in the activity information data store 103.

Each activity tracker 110 is configured to gather information about activities occurring on its virtual machine. For example, activity tracker 110a may track events and actions performed by a user accessing the application 132a. Such events or actions may include window/dialog opening/closing, user interface control selection (e.g., button presses, mouse clicks, menu selections), and the like. The activity tracker 110 may track such events/actions by intercepting system calls and/or event delivery, such as by accessing or hooking into system and/or platform APIs (e.g., Win32, Java, .NET, Linux system calls). The activity tracker 110 then forwards information about the tracked events/actions to the tracker 101, which in turn stores the information in the activity information data store 103.

As noted, activities may also or instead include virtual machine state information, such as may be related to virtual desktop sessions provided or hosted by each of the virtual machines 131a-131c. Virtual machine state information (and generally other types of activity information) may also be tracked by the activity tracker 110 or some other module. For example, in some embodiments, the virtualization logic 134 may itself include a module for tracking and providing indications of networking activity performed by each of the virtual machines 131a-131c.

As another example, the management server 105 (or some other computing system) may include a virtual desktop management module that is configured to facilitate access by client devices 120a-120c to virtual desktops hosted by the virtual machines 131a-131c. The virtual desktop management module may monitor the connection status between a client device 120 and a corresponding virtual machine 131, so as to determine state information such as whether a user is logged in, whether a user is active or inactive, whether a user is connected, and the like. The virtual desktop management module may then provide the determined state information to the tracker 101, which in turn stores it in the activity information data store 103.

The tracker 101 may also digest, correlate, or otherwise analyze activity information received from the activity trackers 110a-110c or other sources. Flows and sequences of events/actions may be analyzed to identify or determine particular activities, such as by identifying patterns of events/actions that are representative of those activities. Probabilistic models may be used to make estimations of user activity based on past statistical evidence. For example, the opening of a new customer dialog box may indicate that a customer account creation activity is occurring. As another example, the opening of a file chooser dialog followed by the selection of a file of a given type or name may indicate that a customer account is being accessed or that a backup operation is occurring. Users whose activities cannot be precisely determined but which can be estimated to fit one of several activities can also be used for actionable resource allocation changes by way of a decision tree (or other statistical model such as a Bayesian network) in which resource changes applying to the majority of possible activities of a given user can be used in the absence of certainty.

The resource allocation manager 100 also receives and stores indications of importance corresponding to activities that may occur on the virtual machines 131a-131c. Such indications may take various forms and be received in various ways. For example, the resource allocation manager 100 may provide access to a user interface that allows an administrative user to rank or prioritize activities. The administrator-user may assign or associate activities with a corresponding importance level, such as a number (e.g., 1-5, with 1 being the highest importance), a letter grade (e.g., A-F, with A being the highest importance), a category (e.g., gold, silver, bronze), or the like. The resource allocation manager 100 then stores the received indications in the activity information data store 103 for use by the dynamic allocator 102, described next.

The dynamic allocator 102 is configured to cause dynamic allocation of the host hardware 135 amongst the virtual machines 131a-131c. For example, the dynamic allocator 102 may transmit a message or request to the virtualization logic 134 to change parameters, settings, or other data that govern allocation of resources on the physical computer 130. The host hardware 135 is allocated based on the importance of the presently occurring activities on the virtual machines 131a-131c. For example, the dynamic allocator 102 may receive an indication of an activity that is currently occurring on virtual machine 131a. The indication may be received directly from the tracker 101 or from the activity information data store 103 (where it was stored by the tracker 101). Then, the dynamic allocator 102 determines the importance of the activity, such as by looking up the activity in the activity information data store 103 and obtaining its corresponding importance (set and stored as discussed above). Next, based on the importance of the activity, the dynamic allocator 102 causes the share or portion of the host hardware 135 that is allocated, assigned, or available to the virtual machine 131a to increase (in the case of more important activities) or decrease (in the case of less important activities). As will be discussed further below, the elements of the hardware 134 may be allocated in a uniform manner or independently from one another. Thus, in some embodiments, CPU resources may be allocated independently from memory resources, in order to more closely match the actual computing needs of a particular activity.

Note that while the resource allocation manager 100 is here shown executing on the management server 105, the resource allocation manager 100 may be executed elsewhere in other embodiments. For example, the resource allocation manager 100 may execute on one of the virtual machines 131a-131c. As another example, some or all of the functions of the resource allocation manager 100 may be performed within the virtualization logic 134. In some embodiments, the resource allocation manager 100 is not a centralized manager as shown, and resource allocation decisions are instead made locally (e.g., within the virtualization logic 134 of each of the computers 130), possibly based on information received from other localized managers using a peer-to-peer distribution model.

The management server 105 may be or execute a commercially available virtual machine management system, such as VirtualCenter by VMware Inc., Virtual Machine Manager by Microsoft Corp., XenCenter by Citrix Inc., or the like. Virtual desktop management facilities, when employed, may be provided by commercial available systems, including VMware's Virtual Desktop Management Server. At least some of the functions of the activity tracker 110 may be provided by commercially available systems, including end user monitoring and performance management tools or systems provided by Knoa Software Inc. The virtualization logic 134 may be or include a hypervisor such as ESXi by VMware, Xen by Citrix, Hyper-V by Microsoft, or the like.

Figure 2B:
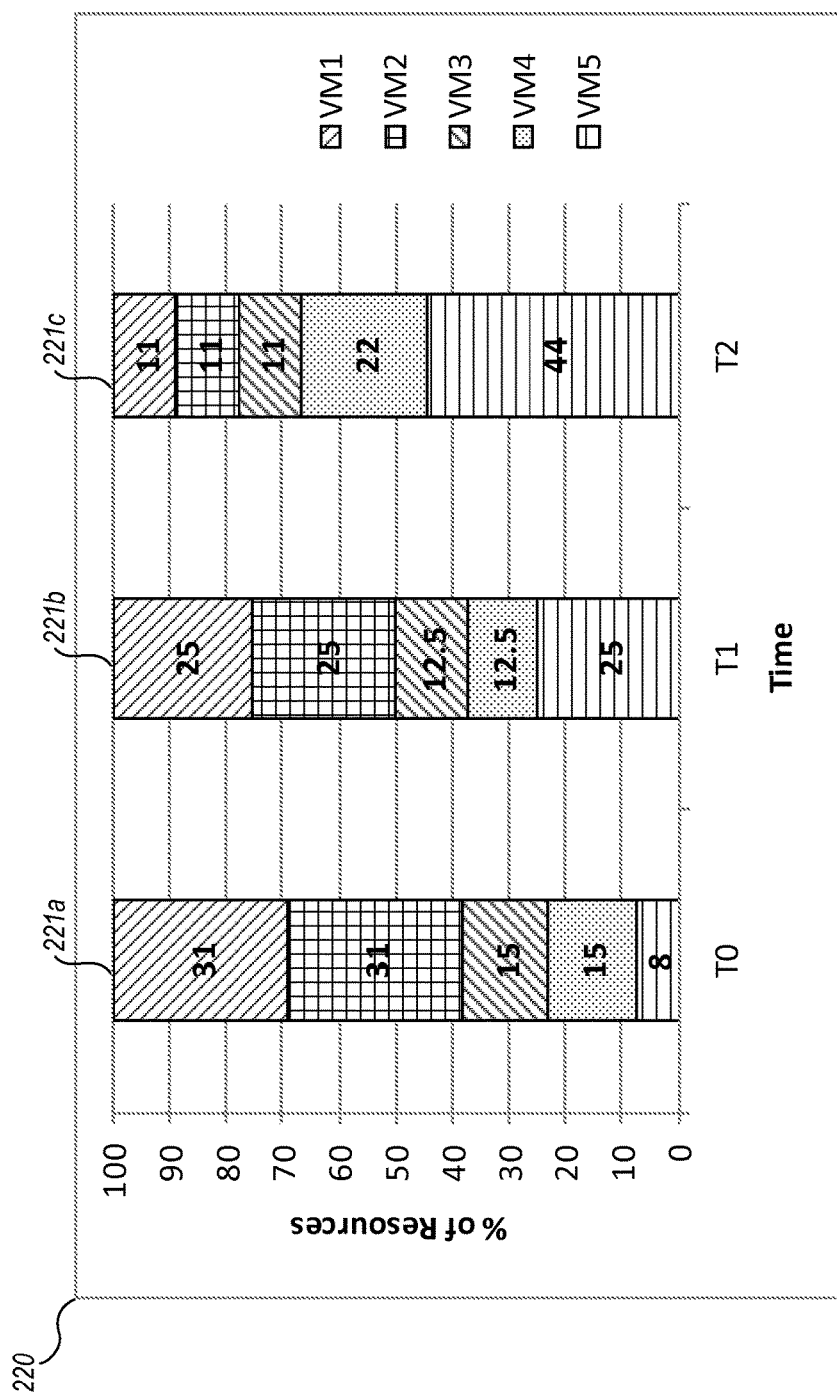
Figure 2D:
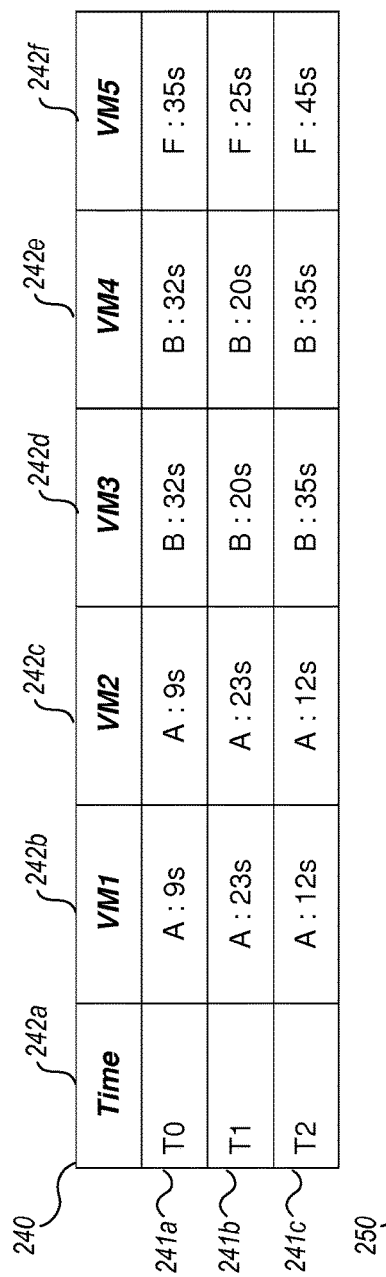
Figure 2D:
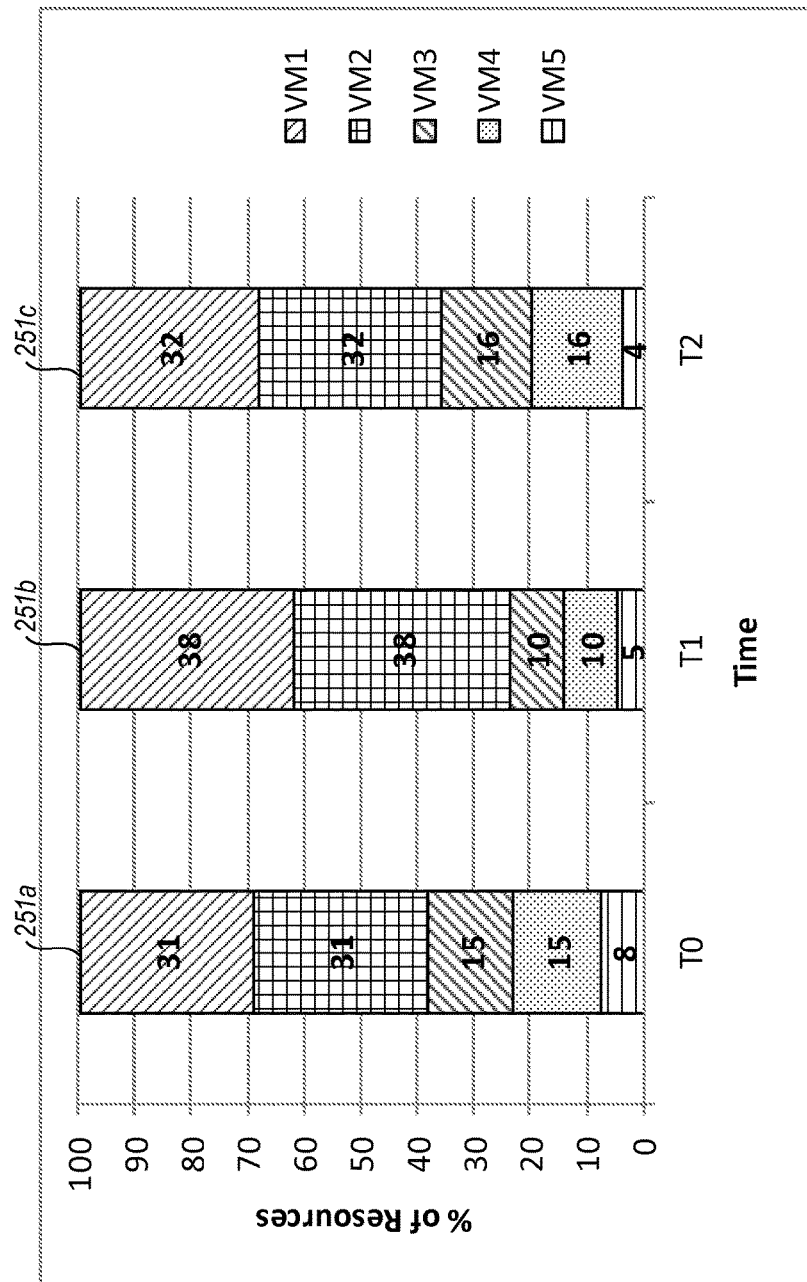

FIGS. 2A-2E illustrate example resource allocation scenarios according to example embodiments. More particularly, FIGS. 2A and 2B illustrate resource allocation in a first embodiment, where resource allocation is triggered upon the occurrence of particular activities. FIGS. 2C and 2D illustrate resource allocation in a second embodiment, where resource allocation is triggered based on the performance of occurring activities. FIG. 2E illustrates resource allocation in a third embodiment, where CPU, memory, I/O, and network resources are allocated independently of one another.

In the embodiment of FIGS. 2A and 2B, the reallocation of physical resources is triggered in response to changes in the mix of activities occurring on virtual machines, such as because an activity is started or ended. FIG. 2A includes a table 200 that associates activities with corresponding levels of importance. In particular, the table 200 includes rows 201a-201m that each represent a single activity type 202a having a corresponding activity identifier ("ID") 202b and a corresponding priority 202c. The priority 202c is a number between 1 and 3, where 1 represents the highest level of importance and 3 represents the lowest level of importance. As noted, importance may be represented in other ways, including by letter grade (e.g., A-F), category (e.g., gold, silver, bronze). In some embodiments, an open-ended scale may be used to represent importance, such as by using the set of integers, where greater values indicate higher levels of importance.

Rows 201a-201g represent example activities that are based on fine-grained, application-level actions, interactions, or events. For example, row 201a represents a new customer record generation activity, which may be based on one or more user interactions or events (e.g., dialog box openings, button clicks) with a customer relationship management software application. The new customer record generation activity of row 201a is considered in this example a highest importance activity, as indicated by the 1 in priority column 202c. As further examples, row 201b represents a record transfer activity (e.g., reflecting a backup operation of a customer record or other data) having a medium importance, as indicated by a 2 in the priority column 202c; and row 201f represents a personal email activity having a low importance, as indicated by a 3 in the priority column 202c.

Rows 201h-201l represent example activities that are based on virtual machine state information, such as session or connection states associated with virtual desktops executing on virtual machines. For example, row 201h represents a state in which there is no user session (e.g., no user logged in) and that is assigned a low importance, as indicated by a 3 in the priority column 202c. As further examples, row 201i represents a state in which there is an active user session (e.g., the user is logged in and currently interacting with their virtual desktop) having a high importance; row 201j represents a state in which there is an idle user session (e.g., the user is logged in but not interacting) having a medium importance; and row 201k represents a state in which there is a user session that has been idle for longer than 5 minutes (e.g., more than 5 minutes has passed since a keyboard or mouse event was received) having a low importance.

Idleness may be understood in various ways. In this embodiment, idleness is determined with respect to a user session with a virtual desktop. In particular a user session may be considered idle if no input events (e.g., keyboard, mouse) have been received from the user for more than a particular time period (e.g., one minute, five minutes). Note that a user session may be idle even though the underlying virtual machine is not idle, such as because the virtual machine is executing a program or instruction sequence that does not entail user interaction (e.g., virus scanning, video/audio encoding/transcoding, scheduled backups, asset inventory scanning). By identifying virtual machines experiencing user session idleness and by characterizing such an activity as being of low importance, resources allocated to those virtual machines may advantageously be allocated to other virtual machines having activities of higher importance, using the techniques described herein.

Prior approaches may determine idleness from a system perspective, such as determining that a virtual machine is idle when the CPU is idle, or when the operating system schedules the idle process. Prior approaches that rely solely on system-based idleness may result in resource allocation that is less optimal than the illustrated embodiment's approach that considers user session-based idleness. In particular, when considering only system-based idleness, a virtual machine may consume resources that could be otherwise allocated to more urgent activities, because it is executing only a non-interactive task (e.g., virus scanning) and thus is not idle from a system perspective. In contrast, the illustrated embodiment will recognize if and when the above example virtual machine has no active user session, and make some of its resources available to activities that are more urgent from a business perspective.

Other states are contemplated and may be used in other embodiments. One embodiment may determine activities based on measurements of the volume or type of network traffic communicated by a virtual machine. For example, network packets directed to particular hosts (e.g., video sharing sites, social networking sites, third-party web sites and/or email systems) may indicate low importance activities. As another example, high volume network traffic from an external site (e.g., due to video or streaming media consumption) may be assigned a low importance level.

Also, note that the illustrated activities need not be mutually exclusive from one another. Thus, more than one activity may be identified as occurring at a particular time. For example, the resource allocation manager may receive a notification that an active user session is present (row 201*i*) and that personal email is being accessed (row 201*f*). Various approaches to resource reallocation based on concurrent activities may be utilized. For example, the resource manager may average the importance of multiple concurrent activities, consider only the highest importance, consider only the lowest importance, consider the activity associated with an application window having 'focus,' or the like.

FIG. 2B illustrates resource allocation with respect to the activity importance information discussed with respect to FIG. 2A, above. FIG. 2B includes a table 210 that represent activities occurring on five distinct virtual machines (executing on the same physical computing system) at three different points in time. In particular, each row 211*a*-211*c* of the table 210 represents a "snapshot" taken at a particular time, indicated in column 212*a*. Columns 212*b*-212*f* identify the activity occurring on each of the five virtual machines at the corresponding time. Activities are identified by activity identifiers corresponding to those used in column 202*b* of table 200 of FIG. 2A. Thus, for example, row 211*a* indicates that at time T0, activity A (new customer record generation—high importance) was occurring on virtual machines VM1 and VM2, activity B (record transfer—medium importance) was occurring on virtual machines VM3 and VM4, and activity F (personal email—low importance) was occurring on virtual machine VM5. At time T1, the same activity occurs on virtual machines VM1-VM4 as at time T0. However, at time T1 a high importance activity (activity A) begins occurring on VM5. Similarly, at time T2, low importance activity F begins occurring on virtual machines VM1-VM3.

FIG. 2B also includes a bar graph 220 that depicts the allocation of physical resources at different points in time, based on the activities shown in table 210. In particular, bars 221*a*-221*c* respectively reflect the resource allocation at times T0-T2, based on the corresponding mix of activities from table 210. For example, bar 221*a* indicates that at time T0 virtual machines VM1 and VM2 each receive about 31 percent of the physical resources, virtual machines VM3 and VM4 each receive about 15 percent of the physical resources, and virtual machine VM5 receives about 8 percent of the physical resources.

Resources may be allocated by assigning "shares" to each of the virtual machines. Virtual machines associated with higher importance activities receive a greater number of shares than do those associated with lower importance activities. Then, the fraction of resources of the physical computing system that are provided to a particular virtual machine is calculated as the share assigned to that virtual machine, divided by the sum of the shares of all of the virtual machines on the physical computing system.

In the illustrated example, a virtual machine having the highest importance activity (e.g., priority 1) receives 400 shares. A virtual machine having the medium importance activity (e.g., priority 2) receives 200 shares. A virtual machine having the lowest importance activity (e.g., priority 3) receives 100 shares. Thus, at time T0, the virtual machines VM1-VM5 respectively receive 400, 400, 200, 200, and 100 shares, yielding a total of 1300 shares. The share allocated to each of virtual machines VM1 and VM2 can be calculated as the ratio 400 over 1300, or about 31%. The share allocated to each of virtual machines VM3 and VM4 can be calculated as the ratio 200 over 1300, or about 15%. And the share allocated to virtual machine VM5 can be calculated as the ratio 100 over 1300, or about 8%.

The dynamic reallocation of physical computing resources is illustrated by graph 220. For example, at time T1, a highest importance activity begins on virtual machine VM5, thereby resulting in an assignment of 400 shares to VM5 (rather than 100 as at T0). Virtual machines VM1-VM4 retain their shares as at time T0, because their activities have not changed. Based on these share allocations, a total of 1600 shares (400+400+200+200+400) are allocated at time T2. As illustrated by bar 221*b*, these share allocations result in virtual machines VM1, VM2, and VM5 each receiving 400 over 1600 (or 25%) of the resources, while virtual machines VM3 and VM4 each receive 200 over 1600 (or 12.5%) of the resources. The changes of resource allocation are similarly evident between times T1 and T2, as illustrated by bar 221*c*.

Note that other approaches for determining the allocation of physical computing resources may be used in other or the same embodiments. For example, one embodiment may assign "reservations" based on the importance of activities occurring on virtual machines. In one embodiment, a reservation is a guarantee that a particular amount or level of resources will be available to a virtual machine. For example, a virtual machine having a most important activity could receive a reservation for 20% of the physical resources, while a virtual machine having a least important activity could receive a reservation for 5%. In some embodiments, a reservation-based approach may be combined with a share-based approach, to guarantee at least a minimum level of resources to every virtual machine. For example, 50% of the physical resources may be allocated using reservations, while the other 50% of the physical resources may be allocated via shares, with the total amount of resources available to any virtual machine being the combination of the allocations under the two schemes.

In the embodiment of FIGS. 2C and 2D, the reallocation of physical resources is triggered in response to changes in the performance of activities occurring on virtual machines, such as when the execution time, response time, or throughput of an activity deviates from its historical average performance. In this "demand-based" approach, resources are allocated to an activity based on both the importance of the activity as well as whether or not the activity actually needs additional resources. Thus, such an approach may result in fewer resource reallocation operations than the more aggressive reallocation approach of FIGS. 2A and 2B, because reallocations will typically not occur unless there is contention for the resources of the physical computing system. Reallocating resources may incur some performance penalty, due to the costs of interacting with the hypervisor and overhead associated with adjusting the appropriate virtualization management data structures on the physical machine. By reducing the number of reallocations performed, this demand-based approach may yield improved overall system performance.

FIG. 2C includes a table 230 that associates activities with corresponding levels of importance and average execution times. Table 230 is similar to table 200 of FIG. 2A, except that table 230 includes an additional column 232c for storing average execution time of the corresponding activity. For example, row 231a associates an average execution time of 10 seconds with the new customer record generation activity, row 231b associates an average execution time of 30 seconds with the record transfer activity, and so on.

FIG. 2D illustrates resource allocation with respect to the activity importance information discussed with respect to FIG. 2C, above. FIG. 2D includes a table 240 that is similar to the table 210 discussed with respect to FIG. 2B, above. The difference is that execution times are represented in association with each identified activity. The execution times shown in table 210 are in this example recently observed average execution times, such as may be averaged over a previous number (e.g., 3, 5, or 10) of occurrences of each activity.

For example, row 241a indicates that at time T0, activity A (new customer record generation—high importance) was occurring on virtual machines VM1 and VM2 and that the execution time of activity A was recently observed to be 9 seconds. Row 241a further indicates that at time T0, activity B (record transfer—medium importance) was occurring on virtual machines VM3 and VM4 with a recently observed execution time of 32 seconds, and that activity F (personal email—low importance) was occurring on virtual machine VM5 with a recently observed execution time of 35 seconds.

Resources will be reallocated by the illustrated embodiment when activity performance degrades outside of a predefined or auto-calculated envelope or range. Some embodiments build, generate, or use statistical models for what constitutes "normal performance," such that what is considered normal may differ at different times of day, day of week, of time of month. Resource allocations may be triggered based on these dynamic and/or time-based thresholds. For example, resources may be reallocated only when recently observed performance is 10% or 20% worse than the historical average. In other embodiments, other measures may be used, such as a number of standard deviations from the norm. In addition, in this embodiment, resources are not reallocated due to activities that are performing better than their historical average. However, some embodiments may perform reallocation under such circumstances in order to reclaim excess capacity.

The recently observed execution times shown in row 241a are about the same as, or better than, the historical averages shown in table 230 of FIG. 2C. In particular, table 230 indicates historical averages of 10, 30, and 45 seconds for activities A, B, and F, respectively. Row 241a of table 240 indicates recently observed execution times of 9, 32, and 35 seconds for activities A, B, and F, respectively. Because the recently observed performance (9, 32, and 35 seconds, respectively) is about the same as or better than the historical averages, resources will not be reallocated at time T0.

FIG. 2D also includes bar graph 250 that is similar to bar graph 220 described with respect to FIG. 2B. Bar graph 250 depicts the allocation of physical resources at different points in time, based on the activities and execution times shown in table 240. Resource allocation in the illustrated embodiment uses a share-based approach similar to that described with respect to FIG. 2B. In particular, under normal execution conditions (e.g., when activities are performing within historical norms), virtual machines with highest importance activities receive 400 shares, virtual machines with medium importance activities receive 200 shares, and virtual machines having lowest importance activities receive 100 shares. In addition, when the performance of an activity drops outside of an acceptable range, the corresponding virtual machine resource share is doubled. Thus, for example, a virtual machine having a poor performing highest importance activity will receive 800 (instead of 400) shares.

Bar 251a illustrates the resource allocation under normal conditions. Because each of the activities is performing as expected at time T0, the relative resource shares assigned to each virtual machine are the same as those in bar 221a of graph 220 (FIG. 2B). In particular, this allocation results because the mix of activities is the same as the scenario of time T0 in FIG. 2B, and because the activities are performing within acceptable performance ranges.

Performance conditions change at time T1, as represented by row 241b of table 240. In particular, the performance of activity A degrades substantially, from 9 seconds to 23 seconds. In light of this degradation, the resource shares assigned to virtual machines VM1 and VM2 are each doubled from 400 to 800. The resource shares for virtual machines VM3-VM5 remain the same (200, 200, and 100, respectively), resulting in a total of 2100 shares. Bar 251b illustrates the resulting changes in resource allocation. Virtual machines VM1 and VM2 each receive 800 over 2100 (or about 38%) of the resources, virtual machines VM3 and VM4 each receive 200 over 2100 (or about 10%) of the resources, and virtual machine VM5 receives 100 over 2100 (or about 5%) of the resources.

Performance conditions change again at time T2, as represented by row 241c of table 240. In particular, the performance of activity B degrades to 35 seconds, compared to the historical average of 30 seconds. In light of this degradation, the resource shares assigned to virtual machines VM3 and VM4 are each doubled from 200 to 400. The resource shares for virtual machines VM1, VM2, and VM5 remain the same as at time T1 (800, 800, and 100, respectively), resulting in a total of 2500 shares. Bar 251c illustrates the resulting changes in resource allocation. Virtual machines VM1 and VM2 each receive 800 over 2500 (or 32%) of the resources, virtual machines VM3 and VM4 each receive 400 over 2500 (or 16%) of the resources, and virtual machine VM5 receives 100 over 2500 (or 4%) of the resources.

Note that in some embodiments, the amount of adjustment to a resource share may be based on the amount of degradation and/or improvement. Thus, an activity that suffers a 50% performance degradation will receive a greater share boost than another activity (of the same importance) that suffers a 25% performance degradation. Various functions may be used to determine the amount of resource boost with respect to the amount of performance degradation, including a linear, quadratic, or the like.

Also, in some embodiments, resource shares may be decreased under certain conditions. For example, if execution times of all of the virtual machines on a particular physical computing system return to a normal state, the resource shares may be normalized or reset to initial allocations. In other examples, activities that are performing faster than normal may result in reduced resource shares for the corresponding virtual machine.

FIG. 2E illustrates resource allocation in a third embodiment that allocates CPU, memory, I/O, and network resources independently of one another. The CPU resource includes the utilization of the central processing unit. The memory resource includes the utilization of dynamic memory (e.g., RAM). The I/O resource includes the amount bandwidth between the processor and the fixed disk or supporting storage system. The network resource includes the amount of bandwidth provided via a networking device.

By way of contrast, the embodiments described with respect to FIGS. 2A-2D allocate resources uniformly across the different physical components of the physical hardware. Thus, if a virtual machine receives twice the resources, it will receive twice the CPU, memory, I/O, and network resources, regardless of whether the activity is CPU or I/O intensive. This may lead to fragmented or suboptimal allocation of resources. For example, a CPU-bound activity will receive additional I/O even though the additional I/O will not improve its performance, and may be better used by some other I/O-intensive activity.

In the embodiment of FIG. 2E, activities are associated with specific hardware needs in a fine-grained manner. In particular, FIG. 2E includes a table 260 that is similar to tables 200 and 230, above. The difference is that rather than having a single importance level associated with each activity, importance levels are associated with CPU, memory, I/O, and network resources independently, as represented in columns 262c-262f. For example, row 261a represents the new customer record generation activity and associated importance levels of 1, 1, 2, and 1 for CPU, memory, I/O, and networking, respectively. The importance levels of row 261a reflect both that this activity is important and that it is not particularly I/O intensive as compared to its CPU, I/O, and networking needs. In other embodiments, importance and resource needs may be decoupled, as described further below. As another example, row 261f represents the personal email activity and associated importance levels of 2, 3, 3, and 2 for CPU, memory, I/O, and networking. The importance levels of row 261f reflect both that this activity is not important and that it is more CPU and networking intensive as compared to its memory and I/O needs.

Approaches similar to those discussed with respect to 2A-2D may then be applied to determine resource allocations. For example, a share-based approach may be used to allocate CPU shares, memory shares, I/O shares, and networking shares independently. By independently considering different physical resources, the embodiment of FIG. 2E may allocate resources in a manner that more closely matches the actual needs of different activities, while retaining unused resources for other applications or activities.

While various approaches to resource allocation are described herein, it is understood that the techniques may be combined or modified in various ways. For example, table 260 may include an additional, overall importance column. Then, the columns for CPU, memory, I/O, and network may represent actual resource needs of various activities, rather than an aggregated or combined measure of need and importance. In other embodiments, the columns 262c-262f may be combined with importance indicators such as those described with respect to tables 200 and/or 230, above. Also, resource needs such as those discussed with respect to FIG. 2E may be determined automatically, such as based on execution profile or history information.

In some embodiments, other factors may be considered when performing resource reallocation. In one embodiment, the resource allocation manager may consider the time of day when allocating resources. It may be known, for example, that particular time periods (e.g., lunchtime) are associated with low or high levels of aggregate resource utilization (e.g., determined based on historical averages). In a period of low resource utilization, the resource allocation manager may exploit this fact to provide resources to a virtual machine that would otherwise not receive such resources (e.g., because it has a low importance activity). Also, energy prices may be considered, so that the resource allocation manager may more freely allocate resources during times of low energy prices (e.g., at night). Other considerations may include business/calendar cycles (e.g., marketing pushes, software release dates, product releases), maintenance events/intervals (e.g., software upgrades, backups), or other cycles, events and/or intervals.

In some embodiments, resources may be dynamically allocated based an observed resource utilization. For example, if an activity is performing poorly, performance information may be consulted to determine that the activity is CPU bound. In response, the resource allocation manager may increase just the CPU share of the resource, while maintaining shares for I/O, memory, and other resources at the same level. Observed resource utilization may be determined with respect to real-time (or substantially real-time) performance profile information collected with respect to executing processes.

Also, although certain terms are used primarily herein, other terms could be used interchangeably to yield equivalent embodiments and examples. For example, it is well-known that equivalent terms in the field of system virtualization or similar or related fields could be substituted for such terms as "physical computer," "hypervisor," "virtual machine," or the like. Specifically, the term "hypervisor" may be used interchangeably with "virtual machine monitor," "virtual machine supervisor," "virtual machine manager," or the like. Likewise, the term "physical computing resource" can be used interchangeably with the terms "physical machine resource," "physical resource," "physical device," or the like. In addition, terms may have alternate spellings which may or may not be explicitly mentioned, and all such variations of terms are intended to be included.

Example embodiments described herein provide applications, tools, data structures and other support to implement a resource allocation manager or similar logic to be used to dynamically allocate physical resources amongst multiple virtual machines based on activities occurring thereon. Other embodiments of the described techniques may be used for other purposes or in other contexts. For example, although described embodiments operate with respect to system or platform virtual machines (e.g., as manage by a hypervisor or virtual machine monitor), the techniques may be applicable with respect to process virtual machines (e.g., the Java virtual machine) or process scheduling at the operating system level. Virtual servers may also be governed by similarly dynamic resource allocation methods, including considerations such as what user groups or numbers of users are using a given virtual server and in what context.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described are not limited by the particular order, selection, or decomposition of aspects described with reference to any particular routine, module, component, or the like.

Example Processes

Figure 3:
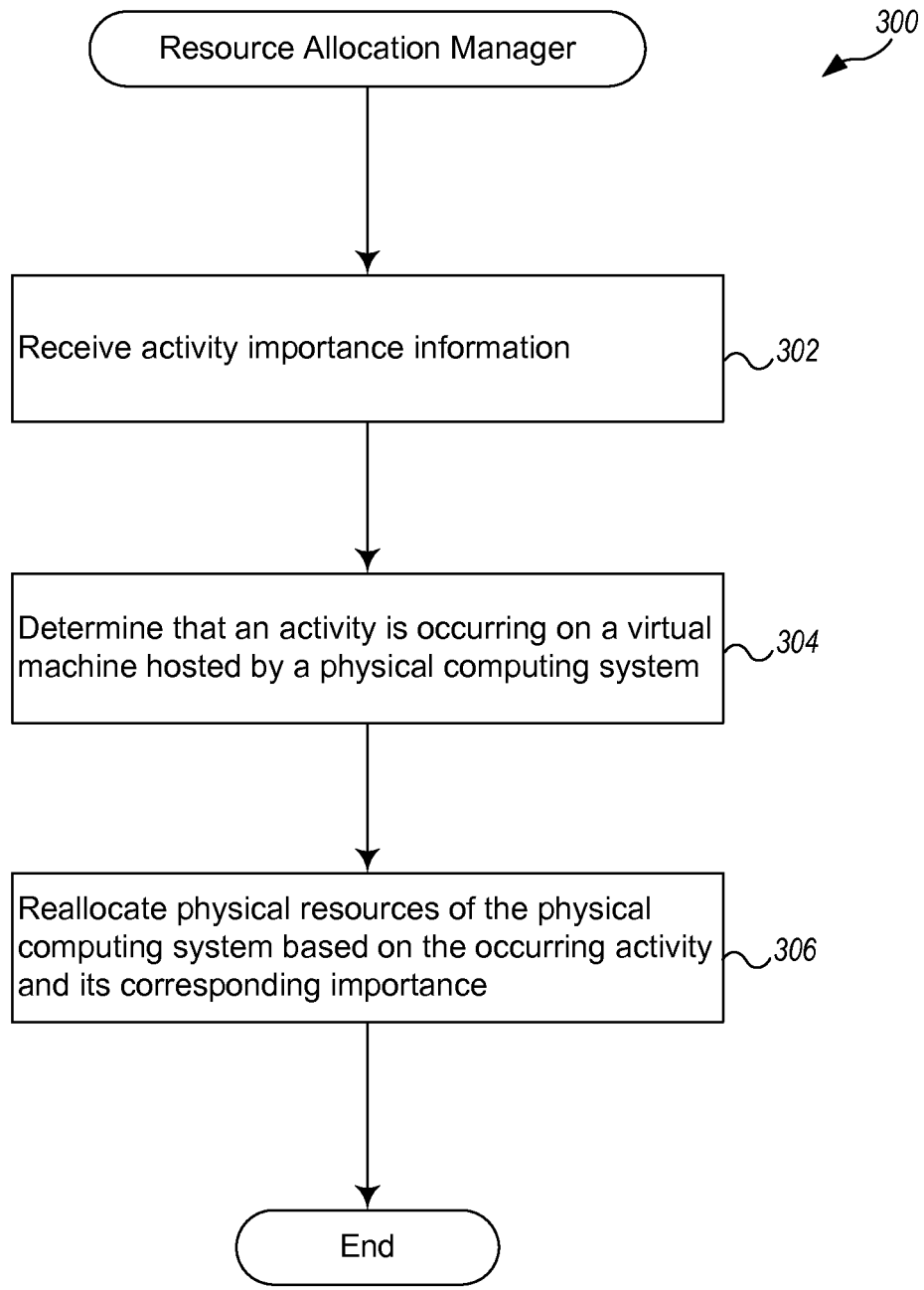
FIG. 3 is a flow diagram of a resource allocation process performed by an example embodiment.

FIG. 3 is an flow diagram of a resource allocation process performed by an example embodiment. FIG. 3 illustrates a resource allocation process 300 that may be performed by, for example, one or more modules of the resource allocation manager 100 described above. The illustrated process dynamically allocates physical computing resources of a physical computing system amongst multiple hosted virtual machines.

At block 302, the process 300 receives activity importance information. Activity importance information may be information such as that described with respect to FIGS. 2A, 2C, and/or 2E, above. Activity importance information may associate levels of importance with multiple different activities that may occur on the multiple virtual machines.

At block 304, the process 300 determines that an activity is occurring on a virtual machine hosted by the physical computing system. The activity may be determined based on one or more application-specific actions or events (e.g., opening of dialog boxes, button presses). In some embodiments, each virtual machine includes a tracking module that is configured to track these and other types of events or states, and forward indications thereof to the process. The process 300 may then analyze, aggregate, map, or otherwise correlate the received indications to determine that a particular sequence of events indicates that the activity is occurring.

At block 306, the process 300 reallocates physical resources of the physical computing system based on the occurring activity and its corresponding importance. The physical resources may be reallocated using an approach such as one described with reference to FIGS. 2A-2E, above. For example, by referencing the activity information (received at block 302), the process 300 may determine that the occurring activity is a highly important activity, and correspondingly increase the share or portion of the physical computing resources assigned or available to the virtual machine on which the activity is occurring. This increased allocation may consequently also diminish the portion of the physical resources available or assigned to other virtual machines executing on the physical computing system.

The process 300 may perform additional operations. For example, after block 306, the process typically returns to block 302 (or 304) to reallocate resources based on newly occurring activities. As another example, the process may gather or consult information about the performance of occurring activities, and reallocate physical resources based at least in part on a comparison of recently observed performance versus historical average performance Historical average performance may be obtained by tracking performance of multiple occurrences of over relatively long time periods (e.g., weeks or months). Recently observed performance may be the performance of a relatively small number (e.g., one, five, ten) of recent occurrence of the activity.

Example Computing System Implementation

Figure 4:
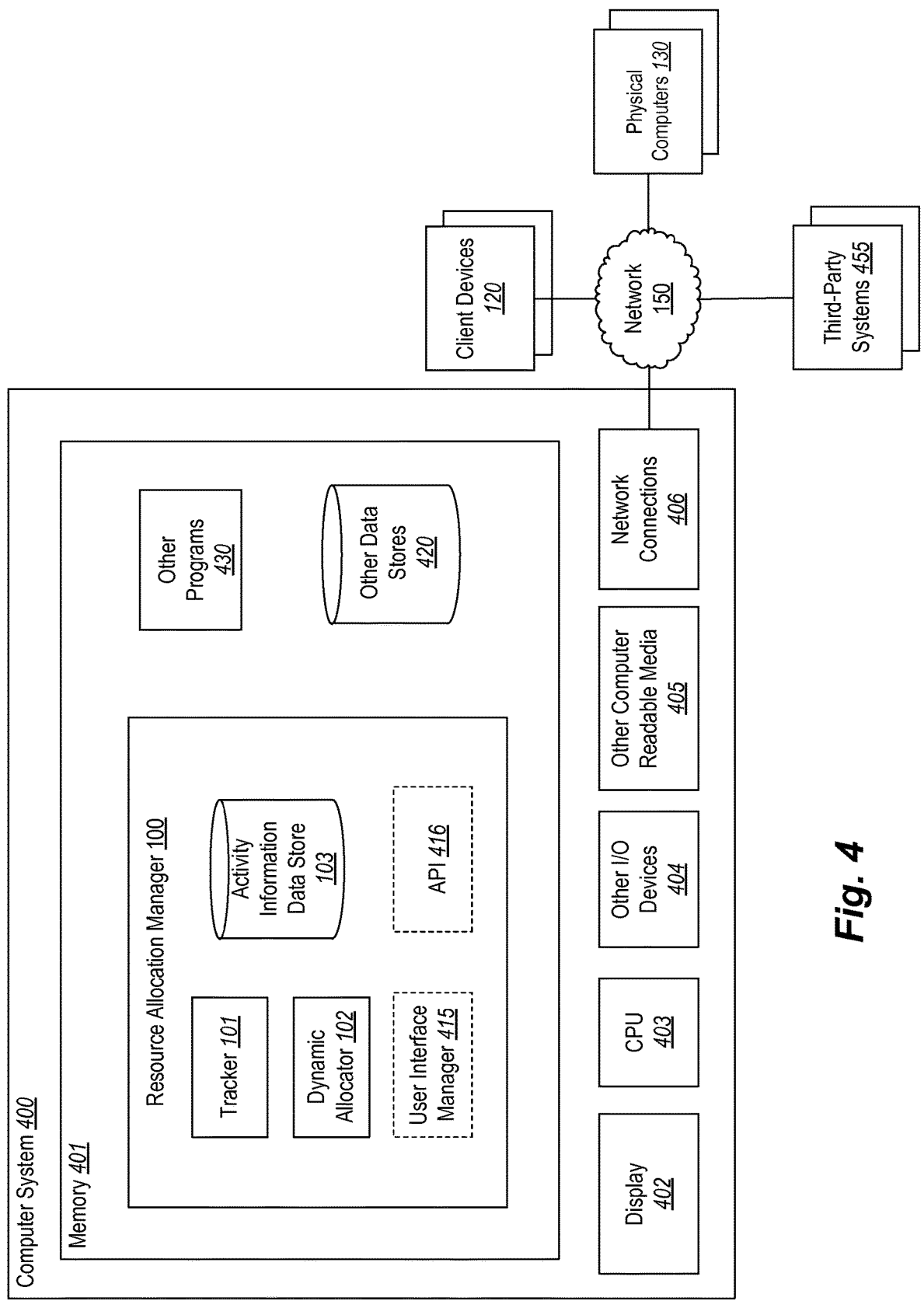
FIG. 4 is a block diagram of an example computing system for implementing a resource allocation manager according to an example embodiment.

FIG. 4 is a block diagram of an example computing system for implementing a resource allocation manager according to an example embodiment. In particular, FIG. 4 shows a computing system 400 that may be utilized to implement a resource allocation manager 100.

Note that one or more general purpose virtual or physical computer systems suitably instructed may be used to implement the resource allocation manager 100. In addition, the computing system 400 may comprise one or more distinct computing systems/devices and may span distributed locations. Furthermore, each block shown may represent one or more such blocks as appropriate to a specific embodiment or may be combined with other blocks. Also, the resource allocation manager 100 may be implemented in software, hardware, firmware, or in some combination to achieve the capabilities described herein.

In the embodiment shown, computing system 400 may comprise a computer memory ("memory") 401, a display 402, one or more Central Processing Units ("CPU") 403, Input/Output devices 404 (e.g., keyboard, mouse, etc.), other computer-readable media 405, and network connections 406. The resource allocation manager 100 is shown residing in memory 401. The components of the resource allocation manager 100 may execute on one or more CPUs 403 and implement techniques described herein. Other code or programs 430 (e.g., an administrative interface, a Web server, and the like) and potentially other data repositories, such as data store 420, may also reside in the memory 401, and execute on one or more CPUs 403. One or more of the components in FIG. 4 may not be present in any specific implementation. For example, some embodiments may not provide other computer readable media 405 or a display 402.

The resource allocation manager 100 interacts via the network 150 with client devices 120, physical computers 130, and/or third-party systems/applications 455. The network 150 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication to and from remotely situated humans and/or devices. The third-party systems/applications 455 may include any systems that provide data to, or utilize data from, the resource allocation manager 100, including remote management/monitoring consoles, performance profilers, activity trackers, or the like.

As discussed, the resource allocation manager 100 dynamically allocates physical computing resources of the physical computers 130 (FIG. 1) amongst multiple virtual machines executing thereon. In the illustrated embodiment, the resource allocation manager 100 includes a tracker 101, a dynamic allocator 102, an activity information data store 103, a user interface manager 415, and an application program interface ("API"). The tracker 101, dynamic allocator 102, and activity information data store 103 are described with respect to FIG. 1. The user interface manager 415 and the API 416 are drawn in dashed lines to indicate that in other embodiments, functions performed by one or more of these components may be performed externally to the resource allocation manager 100.

The UI manager 415 provides a view and a controller that facilitate user interaction with the resource allocation manager 100 and its various components. For example, the UI manager 415 may provide interactive access to the resource allocation manager 100, such that users can configure the operation of the resource allocation manager 100, such as by providing indications of importance associated with various activities. In some embodiments, access to the functionality of the UI manager 415 may be provided via a web server, possibly executing as one of the other programs 430. In such embodiments, a user operating a web browser executing on one of the third-party systems 455 can interact with the resource allocation manager 100 via the UI manager 415.

The API 416 provides programmatic access to one or more functions of the resource allocation manager 100. For example, the API 416 may provide a programmatic interface to one or more functions of the resource allocation manager 100 that may be invoked by one of the other programs 430 or some other module. For example, the API 416 may provide access to functions for specifying levels of importance, allocating resources, providing activity history/performance information, and the like. In this manner, the API 416 facilitates the development of third-party software, such as user interfaces, plug-ins, adapters (e.g., for integrating functions of the resource allocation manager 100 into mobile applications or web sites), and the like.

In addition, the API 416 may be in at least some embodiments invoked or otherwise accessed via remote entities, such as code executing on one of the client devices 120, physical computers 130, and/or the third-party systems/applications 455, to access various functions of the resource allocation manager 100. For example, a module executing on a physical computer 130 may provide information regarding the state of virtual machines or associated virtual desktops of the physical computer 130 to the resource allocation manager 100 via the API 416. As another example, a monitoring console executing on the third-party system 455 may receive information about current or past resource allocations via the API 416.

The activity information data store 103 is an area of memory 401 that is used in this embodiment by the other modules of the resource allocation manager 100 to store and/or communicate information. The components of the resource allocation manager 100 may use the activity information data store 103 to record and/or communicate various types of information, including activity information (e.g., indications of importance, indications of activities occurring on virtual machines, indications of application actions/events and/or virtual machine/desktop states that may be used to determine the occurrence of an activity), resource allocation information (e.g., indications of shares or reservations assigned to particular virtual machines), and the like. Activity information written to activity information data store 103 may be persisted to other computer readable media 405 or to a remote persistent memory storage location (not shown). Although the components of the resource allocation manager 100 are described as communicating at least in part through the activity information data store 103, other communication mechanisms are contemplated, including message passing, function calls, pipes, sockets, shared memory, and the like.

The architecture shown in FIG. 4 may in some embodiments be partially or fully virtualized. For example, the computer system 400 may be one or possibly many virtual machines executing on physical hardware and managed by a hypervisor, virtual machine monitor, or similar technology. Also, the physical computers 130 may include virtualization logic to manage multiple virtual machines. The physical computers may communicate some tracking information to the tracker 101 such as execution times for defined user activities. This information may be used to modify resource allocations on associated virtual servers supporting applications running on these physical computers.

In an example embodiment, components/modules of the resource allocation manager 100 are implemented using standard programming techniques. For example, the resource allocation manager 100 may be implemented as a "native" executable running on the CPU 403, along with one or more static or dynamic libraries. In other embodiments, the resource allocation manager 100 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the resource allocation manager 100, such as in the data store 103 or 420, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 420 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, WebSockets, RPC, RMI, HTTP, web services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the resource allocation manager 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for dynamic resource allocation are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method comprising:
    determining, by a resource allocation manager, that a user session is active on a virtual machine executing on a physical computing device with one or more associated physical computing resources of the physical computing device allocated to the virtual machine;
    responsive to determining the active user session, determining that one or more activities are occurring on the virtual machine, the one or more activities being associated with the active user session;
    receiving an importance level for each of the physical computing resources associated with each of the one or more activities occurring on the virtual machine; and
    based on the importance levels, automatically modifying, by an allocator, a portion of the physical computing resources of the physical computing device allocated to the virtual machine on which the one or more activities are occurring.

2. The method of claim 1, wherein automatically modifying the portion of the physical computing resources comprises automatically modifying the portion of the physical computing resources of the physical computing device, allocated to the virtual machine on which the one or more activities are occurring, so as to match the modified portion to the importance levels.

3. The method of claim 1, further comprising:
    modifying, by virtualization logic, a reservation of the physical computing resources assigned to the virtual machine, wherein the reservation guarantees that a particular amount or level of resources will be available to the virtual machine.

4. The method of claim 1, further comprising:
    tracking a historical average of performance of the one or more activities occurring on the virtual machine, wherein the performance includes one or more of response time of the one or more activities, execution time of the one or more activities, and throughput related to the one or more activities;
    determining that the performance of the one or more activities deviates from the historical average by at least a threshold; and
    modifying the portion of the physical computing resources of the physical computing device allocated to the virtual machine in response to determining that the performance of the one or more activities deviates from the historical average by at least the threshold.

5. The method of claim 1, further comprising:
    modifying, as a part of modifying the portions of the physical computing resources, a portion each of memory, central processing unit (CPU) and network resources assigned to the virtual machine independently of one another.

6. The method of claim 1, further comprising:
    determining that the user session is idle while the virtual machine is not idle and is executing non-interactive program or instruction sequence, wherein virtual machines experiencing user session idleness are assigned lower level of priority; and
    decreasing the portion of the physical computing resources of the physical computing device allocated to the virtual machine in which the user session is idle.

7. The method of claim 1 further comprising:
    determining that a mix of the one or more activities has changed; and
    reallocating the portion of the physical computing resources to the virtual machine based on the change in the mix of the one or more activities.

8. The method of claim 1, wherein determining that the one or more activities are occurring on the virtual machine comprises determining that at least two activities are occurring on at least two different virtual machines including the virtual machine and at least one other virtual machine.

9. The method of claim 8, wherein automatically modifying comprises allocating additional resources to a first activity of the at least two activities whose performance degrades below a first predefined threshold on the virtual machine and reclaiming excess capacity from a second activity of the at least two activities whose performance is better than a second predefined threshold on the at least one other virtual machine.

10. A non-transitory computer readable storage medium including instructions that are executed by one or more processors to cause the one or more processors to execute a set of operations comprising:

determining, by a resource allocation manager, that a user session is active on a virtual machine executing on a physical computing device with one or more associated physical computing resources of the physical computing device allocated to the virtual machine;

responsive to determining the active user session, determining that one or more activities are occurring on the virtual machine, the one or more activities being associated with the active user session;

receiving an importance level for each of the physical computing resources associated with each of the one or more activities occurring on the virtual machine; and based on the importance levels, automatically modifying, by an allocator, a portion of the physical computing resources of the physical computing device allocated to the virtual machine on which the one or more activities are occurring.

11. The non-transitory computer readable storage medium of claim 10, further comprising instructions for:

intercepting system calls by hooking into system or platform application programming interfaces (APIs) to track events and actions performed during the active user session hosted on the virtual machine, the events and actions including one or more of the following: a window opening, window closing, dialog opening, dialog closing, and user interface control selection.

12. The non-transitory computer readable storage medium of claim 10, further comprising instructions for:

modifying, by a virtualization logic, a reservation of the physical computing resources assigned to the virtual machine, wherein the reservation guarantees that a particular amount or level of resources will be available to the virtual machine.

13. The non-transitory computer readable storage medium of claim 10, further comprising instructions for:

tracking a historical average of performance of the one or more activities occurring on the virtual machine, wherein the performance includes one or more of a response time of the one or more activities, an execution time of the one or more activities, and a throughput related to the one or more activities;

determining that the performance of the one or more activities deviates from the historical average by at least a threshold; and modifying the portion of the physical computing resources of the physical computing device allocated to the virtual machine in response to determining that the performance of the one or more activities deviates from the historical average by at least the threshold.

14. The non-transitory computer readable storage medium of claim 10, wherein automatically modifying the portion of the physical computing resources comprises:

determining whether an activity of the one or more activities needs additional resources; and allocating the additional resources based on the importance levels and the determination that the activity of the one or more activities needs additional resources.

15. The non-transitory computer readable storage medium of claim 10, further comprising instructions for:

determining that the user session is idle while the virtual machine is not idle and is executing non-interactive program or instruction sequence, wherein virtual machines experiencing user session idleness are assigned lower indication of priority; and decreasing the portion of the physical computing resources of the physical computing device allocated to the virtual machine in which the user session is idle.

16. A computing device comprising:

one or more processors;

memory having instructions executed by the one or more processors to cause the computing device to:

determine, by a resource allocation manager, that a user session is active on a virtual machine executing on a physical computing device with one or more associated physical computing resources of the physical computing device allocated to the virtual machine;

responsive to determining the active user session, determine that one or more activities are occurring on the virtual machine, the one or more activities being associated with the active user session;

receive an importance level for each of the physical computing resources associated with each of the one or more activities occurring on the virtual machine; and based on the importance levels automatically modify, by an allocator, a portion of the physical computing resources of the physical computing device allocated to the virtual machine on which the one or more activities are occurring.

17. The computing device of claim 16, wherein the memory further comprises instructions for:

intercepting system calls by hooking into system or platform application programming interfaces (APIs) to track events and actions performed during the active user session hosted on the virtual machine.

18. The computing device of claim 16, wherein the memory further comprises instructions for:

modifying, by a virtualization logic, a reservation of the physical computing resources assigned to the virtual machine, wherein the reservation guarantees that a particular amount or level of resources will be available to the virtual machine.

19. The computing device of claim 16, wherein the memory further comprises instructions for:

tracking a historical average of performance of one or more activities occurring on the virtual machine, wherein the performance includes one or more of a response time of the one or more activities, an execution time of the one or more activities, and a throughput related to the one or more activities;

determining that the performance of the one or more activities deviates from the historical average by at least a threshold; and modifying the portion of the physical computing resources of the physical computing device allocated to the virtual machine in response to determining that the performance of the one or more activities deviates from the historical average by at least the threshold.

20. The computing device of claim 16, wherein the memory further comprises instructions for:

modifying, as a part of modifying the portion of the physical computing resources, portions of each of memory, central processing unit (CPU) and network resources assigned to the virtual machine independently of one another.

* * * * *